United States Patent
Korchev et al.

(10) Patent No.: US 10,886,535 B2
(45) Date of Patent: Jan. 5, 2021

(54) ELECTRODES CONTAINING CARBON BLACK PARTICLES AND RELATED METHODS

(71) Applicant: CABOT CORPORATION, Boston, MA (US)

(72) Inventors: Andriy Korchev, Westford, MA (US); Aurelien L. DuPasquier, Westford, MA (US); Miodrag Oljaca, Concord, MA (US); Geoffrey D. Moeser, Groton, MA (US)

(73) Assignee: CABOT CORPORATION, Boston, MA (US)

(*) Notice: Subject to any disclaimer, the term of this patent is extended or adjusted under 35 U.S.C. 154(b) by 129 days.

(21) Appl. No.: 16/009,588

(22) Filed: Jun. 15, 2018

(65) Prior Publication Data
US 2018/0366734 A1    Dec. 20, 2018

Related U.S. Application Data

(60) Provisional application No. 62/520,133, filed on Jun. 15, 2017.

(51) Int. Cl.
| | |
|---|---|
| *H01M 4/02* | (2006.01) |
| *H01M 4/62* | (2006.01) |
| *C09C 1/48* | (2006.01) |
| *C09C 1/50* | (2006.01) |
| *H01M 4/131* | (2010.01) |
| *H01M 4/1391* | (2010.01) |
| *H01M 10/0525* | (2010.01) |

(52) U.S. Cl.
CPC ............... *H01M 4/625* (2013.01); *C09C 1/48* (2013.01); *C09C 1/50* (2013.01); *H01M 4/131* (2013.01); *H01M 4/1391* (2013.01); *H01M 10/0525* (2013.01); *C01P 2002/60* (2013.01); *C01P 2004/51* (2013.01); *C01P 2004/64* (2013.01); *C01P 2006/12* (2013.01); *C01P 2006/19* (2013.01); *C01P 2006/40* (2013.01)

(58) Field of Classification Search
CPC ....................................................... H01M 4/02
See application file for complete search history.

(56) References Cited

U.S. PATENT DOCUMENTS

| | | | |
|---|---|---|---|
| 2009/0208780 A1* | 8/2009 | Sun ........................ | C01B 32/205 429/528 |
| 2016/0024270 A1 | 1/2016 | Schwaiger et al. | |
| 2016/0118667 A1* | 4/2016 | Blizanac ............. | H01M 4/1397 429/231.95 |

OTHER PUBLICATIONS

The International Search Report and the Written Opinion of International Application No. PCT/US2018/037789, dated Aug. 17, 2018.

* cited by examiner

*Primary Examiner* — Jacob B Marks

(57) ABSTRACT

An electrode, includes an electrically conductive substrate; and a composition supported by a surface of the electrically conductive substrate, the composition comprising carbon black particles having a Brunauer-Emmett-Teller (BET) surface area ranging from 80 $m^2/g$ to 1100 $m^2/g$, an oil absorption number equal to or less than 300 mL/100 g, a surface energy of 10 $mJ/m^2$ or less, and a particle size distribution with a $D_{50}$ value equal to or less than 165 nm.

29 Claims, 3 Drawing Sheets

ELECTRODES CONTAINING CARBON BLACK PARTICLES AND RELATED METHODS

CROSS REFERENCE TO RELATED APPLICATION

This application claims priority under 35 U.S. C. § 119(e) to U.S. Provisional Patent Application No. 62/520,133, filed on Jun. 15, 2017, the disclosure of which is hereby incorporated by reference.

FIELD OF THE INVENTION

The invention relates to electrodes including carbon black particles; related methods; and carbon black particles.

BACKGROUND

Lithium-ion batteries are commonly used electrical energy sources for a variety of applications, such as electronic devices and electric vehicles. A lithium-ion battery typically includes a negative electrode (e.g., graphite) and a positive electrode (described below) that allow lithium ions and electrons to move to and from the electrodes during charging and discharging. An electrolyte solution in contact with the electrodes provides a conductive medium in which the ions can move. To prevent direct reaction between the electrodes, an ion-permeable separator is used to physically and electrically isolate the electrodes. When the battery is used as an energy source for a device, electrical contact is made to the electrodes, allowing electrons to flow through the device to provide electrical power, and lithium ions to move through the electrolyte from one electrode to the other electrode.

The positive electrode typically includes a conductive substrate supporting a mixture (e.g., applied as a paste) having at least an electroactive material, a binder, and a conductive additive. The electroactive material, such as a lithium transition metal oxide, is capable of receiving and releasing lithium ions. The binder, such as polyvinylidene fluoride, is used to provide mechanical integrity and stability to the electrode. Typically, since the electroactive material and the binder are electrically poorly conducting or insulating, the conductive additive (e.g., graphite and carbon black) is added to enhance the electrical conductivity of the electrode. The conductive additive and the binder, however, are generally not involved in electrochemical reactions that generate electrical energy, so these materials can negatively affect certain performance characteristics (e.g., capacity and energy density) of the battery since they effectively lower the amount of electroactive material that can be contained in the positive electrode.

SUMMARY

In one aspect, the invention features carbon black particles having relatively small aggregate sizes and/or relatively narrow particle size distributions, and applications of the particles in energy storage devices, such as lithium ion batteries. The small aggregate sizes are expressed by $D_{50}$ values of particle size distributions, and the narrow particle size distributions are expressed as ratios of $D_{75}:D_{25}$ values of particle size distributions, and/or a value based on $D_{90}$, $D_{50}$, and $D_{10}$ values of particle size distributions, namely, a $(D_{90}-D_{10})/D_{50}$ value.

Applicant has found that carbon black particles having relatively small aggregate sizes and/or relatively narrow particle size distributions, when used in lithium ion batteries, are capable of providing better overall performance than other carbon black particles having similar other properties, such as surface areas, structures, crystallinities, and surface energies. The improved performance can be seen, for example, in improved electrode surface resistance, discharge capacity, electrode bulk or volume conductivity, and Ohmic resistance during pulsing. Without being bound by theory, it is believed that, for a given mass, carbon black particles having relatively small aggregate sizes and/or relatively narrow particle size distributions have a larger and more uniform number of particles that may be more effective in covering electroactive materials in electrodes, thereby providing better conductivity between the electroactive materials and improving the performance of the batteries. As a result, compared to other carbon black particles, the carbon black particles described herein may be used at reduced concentrations, thereby allowing more electroactive material to be used to deliver enhanced performance (e.g., energy density and capacity). Alternatively, the carbon black particles described herein can replace other carbon black particles at the same concentrations to deliver enhanced battery performance.

In another aspect, the invention features an electrode, including: an electrically conductive substrate; and a composition supported by a surface of the electrically conductive substrate, the composition comprising carbon black particles having a Brunauer-Emmett-Teller (BET) surface area ranging from 80 $m^2/g$ to 1100 $m^2/g$, an oil absorption number equal to or less than 300 mL/100 g, a surface energy of 10 $mJ/m^2$ or less, and a particle size distribution with a $D_{50}$ value equal to or less than 165 nm.

In another aspect, the invention features a method, including: heat treating carbon black particles having a Brunauer-Emmett-Teller (BET) surface area ranging from 80 $m^2/g$ to 1100 $m^2/g$, an oil absorption number less than 300 mL/100 g, and a particle size distribution with a $D_{50}$ value equal to or less than 165 nm to produce heat-treated carbon black particles having a surface energy of 10 $mJ/m^2$ or less.

In another aspect, the invention features carbon black particles having a Brunauer-Emmett-Teller (BET) surface area ranging from 80 $m^2/g$ to 1100 $m^2/g$, an oil absorption number equal to or less than 300 mL/100 g, a surface energy of 10 $mJ/m^2$ or less, and a particle size distribution with a $D_{50}$ value equal to or less than 165 nm.

In another aspect, the invention features an electrode, including: an electrically conductive substrate; and a composition supported by a surface of the electrically conductive substrate, the composition comprising carbon black particles having a particle size distribution with a $D_{75}:D_{25}$ ratio less than 2.1, a % crystallinity $((I_G/(I_G+I_D))\times100\%)$ equal to or greater than 35%, and an oil absorption number equal to or less than 300 mL/100 g.

In another aspect, the invention features a method, including: heat treating base carbon black particles to produce heat-treated carbon black particles having a particle size distribution with a $D_{75}:D_{25}$ ratio equal to or less than 2.1, a % crystallinity $((I_G/(I_G+I_D))\times100\%)$ equal to or greater than 35%, and an oil absorption number equal to or less than 300 mL/100 g. The base carbon black particles and/or the carbon black particles can have a $D_{75}:D_{25}$ ratio equal to or greater than 1.05, and the base carbon black particles can have a particle size distribution with a $D_{75}:D_{25}$ ratio equal to or less than 2.1. The base carbon black particles and/or the heat-treated carbon black particles can have a $D_{50}$ value equal to or greater than 70 nm.

In another aspect, the invention features carbon black particles having a particle size distribution with a $D_{75}:D_{25}$ ratio equal to or less than 2.1, a % crystallinity (($I_G/(I_G+I_D))\times 100\%$) equal to or greater than 35%, and an oil absorption number equal to or less than 300 mL/100 g.

In another aspect, the invention features an energy storage device including an electrode disclosed herein. The energy storage device can be a lithium ion battery, a primary alkaline battery, a primary lithium battery, a nickel metal hydride battery, a sodium battery, a lithium sulfur battery, a lithium air battery, and a supercapacitor.

Embodiments of one or more aspects may include one or more of the following features. The carbon black particles have an $L_a$ crystallite size equal to or greater than 22 Angstroms, and/or an $L_c$ crystallite size equal to or greater than 17 Angstroms. The carbon black particles have an $L_a$ crystallite size equal to or less than 50 Angstroms, and/or an $L_c$ crystallite size equal to or less than 40 Angstroms. The in the carbon black particles have an oil absorption number equal to or less than 200 mL/100 g. The carbon black particles have an oil absorption number equal to or greater than 140 mL/100 g. The carbon black particles have a statistical thickness surface area equal to or greater than 30 $m^2/g$. The carbon black particles have a statistical thickness surface area equal to or less than 250 $m^2/g$. The carbon black particles have a % crystallinity (($I_G/(I_G+I_D))\times 100\%$) equal to or less than 45%. The carbon black particles have a % crystallinity (($I_G/(I_G+I_D))\times 100\%$) equal to or greater than 35%.

Embodiments of one or more aspects may further include one or more of the following features. The $D_{50}$ value is equal to or greater than 70 nm. The carbon black particles have a particle size distribution with a $D_{75}:D_{25}$ ratio of less than 2.1, and/or a $(D_{90}-D_{10})/D_{50}$ value less than 1.5. The carbon black particles have a particle size distribution with $D_{75}:D_{25}$ ratio of greater than 1.05, and/or a $(D_{90}-D_{10})/D_{50}$ value greater than 1.05. The electrode of any one of the preceding claims, wherein the carbon black particles have a monomodal particle size distribution.

Embodiments of one or more aspects may further include one or more of the following features. The composition includes from 0.5 wt % to 10 wt % of the carbon black particles. The composition further includes a lithium ion-based electroactive material. The composition includes an electroactive material having lithium and cobalt, and from 0.5 wt % to 10 wt % of the carbon black particles.

Other aspects, features, and advantages of the invention will be apparent from the description of the embodiments thereof and from the claims.

DETAILED DESCRIPTION OF THE EMBODIMENTS

Figure 1:
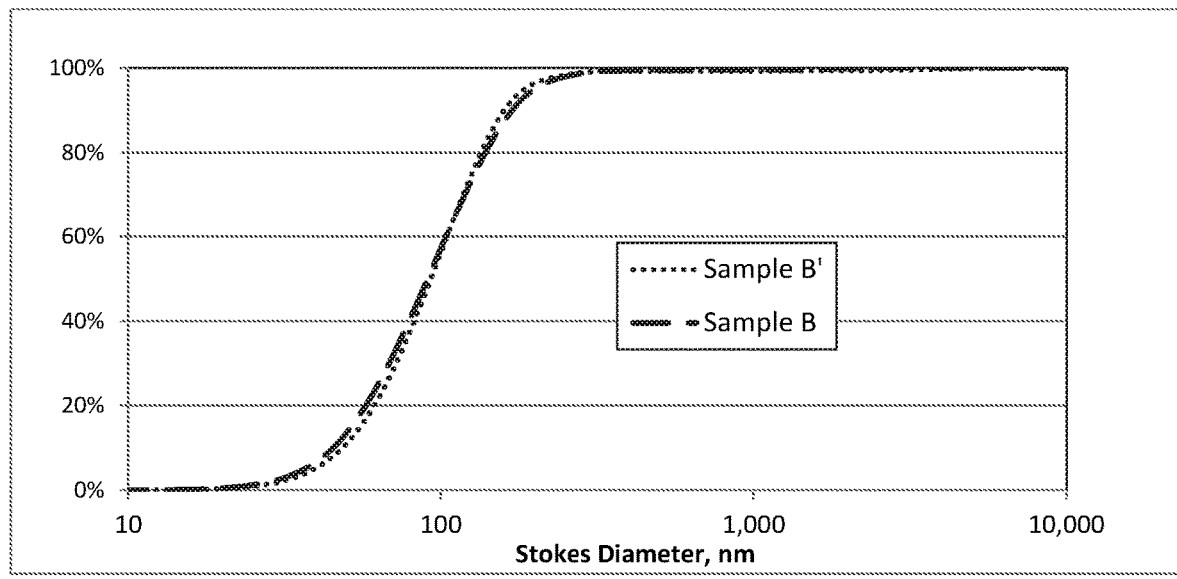
FIG. 1 is a plot showing volume-weighted cumulative distributions, as measured by a differential centrifugal sedimentation (DCS) method, for Sample B' (CSX-946, Cabot Corporation, prior to heat treatment) and Sample B (after heat treatment).

Described below are carbon black particles, methods of making the particles, compositions including the particles, and applications of the particles in energy storage devices (e.g., lithium-ion batteries).

The carbon black particles can generally be characterized in multiple, independent ways. In some embodiments, the carbon black particles are characterized by their (1) Brunauer-Emmett-Teller (BET) total surface areas, (2) surface energies, and (3) aggregate size distributions, as indicated by $D_{50}$ values of particle size distributions. The carbon black particles can further have one or more (e.g., at least one, two, three, four, or more) of the following additional properties: oil absorption numbers (OANs), statistical thickness surface areas, ratios of $D_{75}:D_{25}$ values and/or $(D_{90}-D_{10})/D_{50}$ values, and/or crystallinity characteristics (as indicated by $L_a$ and/or $L_c$ Raman microcrystalline planar sizes and/or % crystallinities), in any combination. In other embodiments, the carbon black particles are characterized by their crystallinity characteristics and ratios of $D_{75}:D_{25}$ values and/or $(D_{90}-D_{10})/D_{50}$ values. The carbon black particles can further have one or more (e.g., at least one, two, three, four, or more) of the following additional properties: OANs, BET total surface areas, statistical thickness surface areas, surface energies, aggregate size distributions, and/or other crystallinity characteristics, in any combination.

The carbon black particles have a wide range of total surface areas. Without being bound by theory, it is believed that, during use of a battery, there are chemical side reactions that can occur within the battery that degrade its performance. Having particles with lower surface areas can enhance the performance of the battery by providing fewer surface sites where these unwanted side reactions can occur. However, the surface areas of the particles should be balanced, i.e., high enough, so that the particles can sufficiently cover and/or bridge the electroactive material and provide the desired electrode conductivity. In some embodiments, the carbon black particles have a BET surface area ranging from 80 to 1100 $m^2/g$. The BET surface area can have or include, for example, one of the following ranges: from 80 to 1000 $m^2/g$, or from 80 to 900 $m^2/g$, or from 80 to 800 $m^2/g$, or from 80 to 700 $m^2/g$, or from 80 to 600 $m^2/g$, or from 80 to 500 $m^2/g$, or from 80 to 400 $m^2/g$, or from 80 to 300 $m^2/g$, or from 200 to 1100 $m^2/g$, or from 200 to 1000 $m^2/g$, or from 200 to 900 $m^2/g$, or from 200 to 800 $m^2/g$, or from 200 to 700 $m^2/g$, or from 200 to 600 $m^2/g$, or from 200 to 500 $m^2/g$, or from 200 to 400 $m^2/g$, or from 300 to 1100 $m^2/g$, or from 300 to 1000 $m^2/g$, or from 300 to 900 $m^2/g$, or from 300 to 800 $m^2/g$, or from 300 to 700 $m^2/g$, or from 300 to 600 $m^2/g$, or from 300 to 500 $m^2/g$, or from 400 to 1100 $m^2/g$, or from 400 to 1000 $m^2/g$, or from 400 to 900 $m^2/g$, or from 400 to 800 $m^2/g$, or from 400 to 700 $m^2/g$, or from 400 to 600 $m^2/g$, or from 500 to 1100 $m^2/g$, or from 500 to 1000 m²/g, or from 500 to 900 m²/g, or from 500 to 800 m²/g, or from 500 to 700 m²/g, or from 600 to 1100 m²/g, or from 600 to 1000 m²/g, or from 600 to 900 m²/g, or from 600 to 800 m²/g, or from 700 to 1100 m²/g, or from 700 to 1000 m²/g, or from 700 to 900 m²/g, or from 800 to 1100 m²/g, or from 800 to 1000 m²/g, or from 900 to 1100 m²/g. Other ranges within these ranges are possible. All BET surface area values disclosed herein refer to BET nitrogen surface area and are determined by ASTM D6556-10, the entirety of which is incorporated herein by reference.

In some embodiments, the carbon black particles have a high degree of graphitization, which can be indicated by lower surface energy values that can be associated with lower amounts of residual impurities on the surface of carbon black particles, and thus, their hydrophobicity. Without being bound by theory, it is believed that, up to a threshold purity level, purer particles can provide improved electrical conductivity and reduced likelihood of side reactions, thereby improving the performance of the particles. Surface energy can be measured by Dynamic Vapor (Water) Sorption (DVS) or water spreading pressure (described below). In some embodiments, the carbon black has a surface energy (SE) less than or equal to 15 mJ/m², e.g., from the detection limit (about 2 mJ/m²) to 15 mJ/m². The surface energy can have or include, for example, one of the following ranges: from the detection limit to 12 mJ/m², or from the detection limit to 10 mJ/m², or from the detection limit to 8 mJ/m², or from the detection limit to 6 mJ/m², or from the detection limit to 5 mJ/m², or from the detection limit to 4 mJ/m². In certain embodiments, the surface energy, as measured by DWS, is less than 14 mJ/m², or less than 12 mJ/m², or less than 10 mJ/m², or less than 8 mJ/m², or less than 6 mJ/m², or less than 5 mJ/m², or less than 4 mJ/m², or at the detection limit. Other ranges within these ranges are possible.

Water spreading pressure is a measure of the interaction energy between the surface of carbon black (which absorbs no water) and water vapor. The spreading pressure is measured by observing the mass increase of a sample as it adsorbs water from a controlled atmosphere. In the test, the relative humidity (RH) of the atmosphere around the sample is increased from 0% (pure nitrogen) to about 100% (water-saturated nitrogen). If the sample and atmosphere are always in equilibrium, the water spreading pressure ($\pi_e$) of the sample is defined as:

$$\pi_e = \frac{RT}{A} \int_0^{P_O} \Gamma d\ln P$$

where R is the gas constant, T is the temperature, A is the BET surface area of the sample as described herein, $\Gamma$ is the amount of adsorbed water on the sample (converted to moles/gm), P is the partial pressure of water in the atmosphere, and $P_o$ is the saturation vapor pressure in the atmosphere. In practice, the equilibrium adsorption of water on the surface is measured at one or (preferably) several discrete partial pressures and the integral is estimated by the area under the curve.

The procedure for measuring the water spreading pressure is detailed in "Dynamic Vapor Sorption Using Water, Standard Operating Procedure", rev. Feb. 8, 2005 (incorporated in its entirety by reference herein), and is summarized here. Before analysis, 100 mg of the carbon black to be analyzed was dried in an oven at 125° C. for 30 minutes. After ensuring that the incubator in the Surface Measurement Systems DVS1 instrument (supplied by SMS Instruments, Monarch Beach, Calif.) had been stable at 25° C. for 2 hours, sample cups were loaded in both the sample and reference chambers. The target RH was set to 0% for 10 minutes to dry the cups and to establish a stable mass baseline. After discharging static and taring the balance, approximately 10-12 mg of carbon black was added to the cup in the sample chamber. After sealing the sample chamber, the sample was allowed to equilibrate at 0% RH. After equilibration, the initial mass of the sample was recorded. The relative humidity of the nitrogen atmosphere was then increased sequentially to levels of approximately 0, 5, 10, 20, 30, 40, 50, 60, 70, 80, 90, and 95% RH, with the system allowed to equilibrate for 20 minutes at each RH level. The mass of water adsorbed at each humidity level was recorded, from which water spreading pressure was calculated (see above). The measurement was done twice on two separate samples and the average value is reported.

The aggregate size distribution of the carbon black particles, as indicated by their $D_{50}$ values (also known as the "mass median diameter") of their particle size distributions, can range from about 70 nm to about 165 nm. Without being bound by theory, it is believed that, for a given structure (e.g., as indicated by an OAN) and mass, a smaller aggregate size is indicative of a higher number of particles, which can improve conductivity. It is believed that carbon black particles having the aggregate size distribution disclosed herein are capable of improving conductivity. The $D_{50}$ values can have or include, for example, one of the following ranges: from 70 to 155 nm, or from 70 to 145 nm, or from 70 to 135 nm, or from 70 to 125 nm, or from 70 to 115 nm, or from 70 to 105 nm, or from 70 to 95 nm, from 80 to 165 nm, from 80 to 155 nm, or from 80 to 145 nm, or from 80 to 135 nm, or from 80 to 125 nm, or from 80 to 115 nm, or from 80 to 105 nm, or from 90 to 165 nm, or from 90 to 155 nm, or from 90 to 145 nm, or from 90 to 135 nm, or from 90 to 125 nm, or from 90 to 115 nm, or from 100 to 165 nm, or from 100 to 155 nm, or from 100 to 145 nm, or from 100 to 135 nm, or from 100 to 125 nm, or from 110 to 165 nm, or from 110 to 155 nm, or from 110 to 145 nm, or from 110 to 135 nm, or from 120 to 165 nm, or from 120 to 155 nm, or from 120 to 145 nm, or from 130 to 165 nm, or from 130 to 155 nm, or from 140 to 165 nm, or from 150 to 165 nm. Other ranges within these ranges are possible. In some embodiments, the particle size distribution is monomodal, i.e., has only one peak, not bimodal or otherwise multimodal. Particle size distribution measurements to determine the D-values disclosed herein (e.g., $D_{10}$, $D_{25}$, $D_{50}$, $D_{75}$, and $D_{90}$ values) were performed using a differential centrifugal sedimentation (DCS) method. The DCS method was performed using a disc centrifuge (CPS Instruments, Model DC24000) and an ultrasonic processor (Branson, Model 450D with a half-inch probe tip). Dispersion samples were prepared by sonicating compositions each containing 0.02 g carbon black and 50 ml dispersion fluid (75% v/v water, 25% v/v ethanol and 0.05% w/v Triton X100 surfactant) at an amplitude of 60% for ten minutes. Instrument settings included a particle density of 1.86; a refractive index of 1.84; an absorptivity of 0.85; and a non-sphericity of 1.0. Run conditions included a disc speed of 24K rpm; a gradient of 24 to 8% sucrose in deionized water (14.4 ml); a gradient density of 1.045; a gradient refractive index of 1.345; a gradient viscosity of 1.25 cP; and a calibration standard of 237 nm polystyrene (density 1.385).

Additionally or alternatively to the $D_{50}$ values indicated herein, in some embodiments, the carbon black particles have relatively narrow particle size distributions, as indicated by the ratios of the $D_{75}$ value and the $D_{25}$ value, herein the $D_{75}:D_{25}$ ratio or $D_{75}:D_{25}$ value ratio. The $D_{75}:D_{25}$ ratios can range from 1.05 to 2.1. The $D_{75}:D_{25}$ ratios can have or include, for example, one of the following ranges: from 1.05 to 1.9, or from 1.05 to 1.7, or from 1.05 to 1.5, or from 1.05 to 1.3, or from 1.2 to 2.1, or from 1.2 to 1.9, or from 1.2 to 1.7, or from 1.2 to 1.5, or from 1.4 to 2.1, or from 1.4 to 1.9, or from 1.4 to 1.7, or from 1.6 to 2.1, or from 1.6 to 1.9, or from 1.8 to 2.1, or from 2.0 to 2.1. Other ranges within these ranges are possible. As used herein, a $D_x$ value is the value of the particle diameter at X % in the volume-weighted cumulative distribution. For example, the $D_{75}$ value is the value of the particle diameter at 75% in the cumulative distribution, and the $D_{25}$ the value of the particle diameter at 25% in the cumulative distribution.

Additionally or alternatively to the $D_{50}$ values and/or $D_{75}:D_{25}$ ratios indicated herein, in some embodiments, the relatively narrow particle size distributions of the carbon black particles are expressed as a ratio of the difference of the $D_{90}$ and $D_{10}$ values to the $D_{50}$ value, i.e., the $(D_{90}-D_{10})/D_{50}$ value. The $(D_{90}-D_{10})/D_{50}$ value can range from 1 to 3. The $(D_{90}-D_{10})/D_{50}$ value can have or include, for example, one of the following ranges: from 1 to 2.8, or from 1 to 2.6, or from 1 to 2.4, or from 1 to 2.2, or from 1 to 2.0, or from 1 to 1.8, or from 1 to 1.6, or from 1 to 1.4, or from 1.2 to 3, or from 1.2 to 2.8, or from 1.2 to 2.6, or from 1.2 to 2.4, or from 1.2 to 2.2, or from 1.2 to 2.0, or from 1.2 to 1.8, or from 1.2 to 1.6, or from 1.4 to 3, or from 1.4 to 2.8, or from 1.4 to 2.6, or from 1.4 to 2.4, or from 1.4 to 2.2, or from 1.4 to 2, or from 1.4 to 1.8, or from 1.6 to 3, or from 1.6 to 2.8, or from 1.6 to 2.6, or from 1.6 to 2.4, or from 1.6 to 2.2, or from 1.6 to 2, or from 1.8 to 3, or from 1.8 to 2.8, or from 1.8 to 2.6, or from 1.8 to 2.4, or from 1.8 to 2.2, or from 2 to 3, or from 2 to 2.8, or from 2 to 2.6, or from 2 to 2.4, or from 2.2 to 3, or from 2.2 to 2.8, or from 2.2 to 2.6, or from 2.4 to 3, or from 2.4 to 2.8, or from 2.6 to 3. Other ranges within these ranges are possible.

The carbon black particles can have a range of oil absorption numbers (OANs), which are indicative of the particles' structures, or volume-occupying properties. For a given mass, high structure carbon black particles can occupy more volume than other carbon black particles having lower structures. When used as a conductive additive in a battery electrode, carbon black particles having relatively high OANs can provide a continuously electrically-conductive network (i.e., percolate) throughout the electrode at relatively lower loadings. Consequently, more electroactive material can be used, thereby improving the performance of the battery. In some embodiments, the carbon black particles have OANs ranging from 140 to 300 mL/100 g. The OANs can have or include, for example, one of the following ranges: from 140 to 285 mL/100 g, or from 140 to 265 mL/100 g, or from 140 to 245 mL/100 g, or from 140 to 225 mL/100 g, or from 140 to 205 mL/100 g, or from 140 to 195 mL/100 g, or from 140 to 175 mL/100 g, or from 140 to 155 mL/100 g, or from 160 to 300 mL/100 g, or from 160 to 285 mL/100 g, or from 160 to 265 mL/100 g, or from 160 to 245 mL/100 g, from 160 to 225 mL/100 g, or from 160 to 205 mL/100 g, or from 160 to 195 mL/100 g, or from 160 to 175 mL/100 g, or from 180 to 300 mL/100 g, or from 180 to 285 mL/100 g, or from 180 to 265 mL/100 g, or from 180 to 245 mL/100 g, or from 180 to 225 mL/100 g, or from 180 to 205 mL/100 g, or from 180 to 195 mL/100 g, or from 200 to 300 mL/100 g, or from 200 to 285 mL/100 g, or from 200 to 265 mL/100 g, or from 200 to 245 mL/100 g, or from 200 to 225 mL/100 g, or from 220 to 300 mL/100 g, or from 220 to 285 mL/100 g, or from 220 to 265 mL/100 g, or from 220 to 245 mL/100 g, or from 240 to 300 mL/100 g, or from 240 to 285 mL/100 g, or from 240 to 265 mL/100 g, or from 260 to 300 mL/100 g, or from 260 to 285 mL/100 g, or from 280 to 300 mL/100 g. Other ranges within these ranges are possible. All OAN values cited herein are determined by the method described in ASTM D 2414-16.

As with the OANs and BET surface areas, the carbon black particles can have a range of statistical thickness surface areas (STSAs). In some embodiments, the carbon black particles have STSAs ranging from 30 to 250 $m^2/g$. The STSAs can have or include, for example, one of the following ranges: from 30 to 200 $m^2/g$, or from 30 to 150 $m^2/g$, or from 30 to 100 $m^2/g$, or from 30 to 50 $m^2/g$, or from 50 to 250 $m^2/g$, or from 50 to 200 $m^2/g$, or from 50 to 150 $m^2/g$, or from 50 to 100 $m^2/g$, or from 100 to 250 $m^2/g$, or from 50 to 200 $m^2/g$, or from 50 to 150 $m^2/g$, or from 50 to 100 $m^2/g$, or from 100 to 250 $m^2/g$, or from 100 to 200 $m^2/g$, or from 100 to 150 $m^2/g$, or from 150 to 250 $m^2/g$, or from 150 to 200 $m^2/g$, or from 200 to 250 $m^2/g$. Other ranges within these ranges are possible. In certain embodiments, the carbon black particles can have statistical thickness surface areas that are substantially the same as the BET total surface areas described above, which indicate that the particles are substantially not porous. Without being bound by theory, it is believed that pores create tortuous paths within the particles that can impede the flow of ions (e.g., lithium ions), particularly at a low state of charge and/or at high discharge rates. Additionally, a higher degree of porosity can create higher total surface areas, which, as described above, can lead to more unwanted chemical side reactions. In some embodiments, the carbon black particles have a ratio of STSA to BET surface area (STSA:BET ratio) greater than 0.8:1, e.g., greater than 0.82:1, or greater than 0.84:1, or greater than 0.86:1, or greater than 0.88:1, or greater than 0.9:1, or greater than 0.92:1, or greater than 0.94:1, or greater than 0.96:1, or greater than 0.98:1. Statistical thickness surface area is determined by ASTM D6556-10 to the extent that such determination is reasonably possible since in some cases heat treatment of some carbon black particles can affect the ability to determine STSA.

The carbon black particles generally have moderate crystalline domain sizes and/or moderate degrees of crystallinity. Without being bound by theory, it is believed that certain domain sizes and/or crystallinities can enhance the conductivity and performance of the particles by reducing the electrical resistance that can occur when electrons move between different areas or phases of material. However, domain sizes that are too big and/or crystallinities that are too high can degrade electrical conductivity since, it is believed, other conducting mechanisms (e.g., holes) can be affected.

The crystalline domains can be characterized by an $L_a$ crystallite size, as determined by Raman spectroscopy. $L_a$ is defined as 43.5×(area of G band/area of D band). The crystallite size can give an indication of the degree of graphitization, where a higher $L_a$ value correlates with a higher degree of graphitization. Raman measurements of $L_a$ were based on Gruber et al., "Raman studies of heat-treated carbon blacks," *Carbon* Vol. 32 (7), pp. 1377-1382, 1994, which is incorporated herein by reference. The Raman spectrum of carbon includes two major "resonance" bands or peaks at about 1340 $cm^{-1}$ and 1580 $cm^{-1}$, denoted as the "D" and "G" bands, respectively. It is generally considered that the D band is attributed to disordered $sp^2$ carbon, and the G band to graphitic or "ordered" $sp^2$ carbon. Using an empirical approach, the ratio of the G/D bands and an $L_a$ measured by X-ray diffraction (XRD) are highly correlated, and regression analysis gives the empirical relationship:

$$L_a = 43.5 \times (\text{area of } G \text{ band}/\text{area of } D \text{ band}),$$

in which $L_a$ is calculated in Angstroms. Thus, a higher $L_a$ value corresponds to a more ordered crystalline structure.

In some embodiments, the carbon black has an $L_a$ crystallite size of less than or equal to 50 Å, for example, from 22 Å to 50 Å. The $L_a$ crystallite size can have or include, for example, one of the following ranges: from 22 to 45 Å, or from 22 to 40 Å, or from 22 to 35 Å, or from 22 to 30 Å, or from 25 to 50 Å, or from 25 to 45 Å, or from 25 to 40 Å, or from 25 to 35 Å, or from 30 to 50 Å, or from 30 to 45 Å, or from 30 to 40 Å, or from 35 to 50 Å, or from 35 to 45 Å, or from 40 to 50 Å. In certain embodiments, the $L_a$ crystallite size is less than or equal to 50 Å, or less than or equal to 45 Å, or less than or equal to 40 Å, or less than or equal to 35 Å or less than or equal to 30 Å, or less than or equal to 25 Å. In some embodiments, the $L_a$ crystallite size is greater than or equal to 22 Å, or greater than or equal to 25 Å, or greater than or equal to 30 Å, or greater than or equal to 35 Å, or greater than or equal to 40 Å, or greater than or equal to 45 Å.

The crystalline domains can be characterized by an $L_c$ crystallite size. The $L_c$ crystallite size was determined by X-ray diffraction using an X-ray diffractometer (PANalytical X'Pert Pro, PANalytical B.V.), with a copper tube, tube voltage of 45 kV, and a tube current of 40 mA. A sample of carbon black particles was packed into a sample holder (an accessory of the diffractometer), and measurement was performed over angle (2θ) range of 10° to 80°, at a speed of 0.14°/min. Peak positions and full width at half maximum values were calculated by means of the software of the diffractometer. For measuring-angle calibration, lanthanum hexaboride (LaB$_6$) was used as an X-ray standard. From the measurements obtained, the $L_c$ crystallite size was determined using the Scherrer equation: $L_c$ (Å)=K*λ/(β*cos θ), where K is the shape factor constant (0.9); λ is the wavelength of the characteristic X-ray line of Cu K$_{\alpha1}$ (1.54056 Å); β is the peak width at half maximum in radians; and θ is determined by taking half of the measuring angle peak position (2θ).

A higher $L_c$ value corresponds to a more ordered crystalline structure. In some embodiments, the carbon black has an $L_c$ crystallite size of less than or equal to 40 Å, for example, from 17 Å to 40 Å. The $L_c$ crystallite size can have or include, for example, one of the following ranges: from 17 to 39 Å, or from 17 to 37 Å, or from 17 to 35 Å, or from 17 to 33 Å, or from 17 to 31 Å, or from 17 to 29 Å, or from 17 to 27 Å, or from 17 to 25 Å, or from 17 to 23 Å, or from 17 to 21 Å, or from 19 to 39 Å, or from 19 to 37 Å, or from 19 to 35 Å, or from 19 to 33 Å, or from 19 to 31 Å, or from 19 to 29 Å, or from 19 to 27 Å, or from 19 to 25 Å, or from 19 to 23 Å, or from 21 to 39 Å, or from 21 to 37 Å, or from 21 to 35 Å, or from 21 to 33 Å, or from 21 to 31 Å, or from 21 to 29 Å, or from 21 to 27 Å, or from 21 to 25 Å, or from 23 to 39 Å, or from 23 to 37 Å, or from 23 to 35 Å, or from 23 to 33 Å, or from 23 to 31 Å, or from 23 to 29 Å, or from 23 to 27 Å, or from 25 to 39 Å, or from 25 to 37 Å, or from 25 to 35 Å, or from 25 to 33 Å, or from 25 to 31 Å, or from 25 to 29 Å, or from 27 to 39 Å, or from 27 to 37 Å, or from 27 to 35 Å, or from 27 to 33 Å, or from 27 to 31 Å, or from 29 to 39 Å, or from 29 to 37 Å, or from 29 to 35 Å, or from 29 to 33 Å, or from 31 to 39 Å, or from 31 to 37 Å, or from 31 to 35 Å, or from 33 to 39 Å, or from 33 to 37 Å, or from 35 to 39 Å, or from 37 to 39 Å. In certain embodiments, the $L_c$ crystallite size can be less than or equal to 35 Å, or less than or equal to 30 Å, or less than or equal to 25 Å, or less than or equal to 20 Å.

The carbon black particles can have a high degree of graphitization, as indicated by a high % crystallinity, which is obtained from Raman measurements as a ratio of the area of the G band and the areas of G and D bands ($I_G/(I_G+I_D)$). A high % crystallinity can be achieved by using a high heat treatment temperature and, in some embodiments, a longer heat treatment time (described below). In certain embodiments, the carbon black particles have % crystallinities (($I_G/(I_G+I_D)$)×100%) ranging from 35% to 55%, as determined by Raman spectroscopy. The % crystallinity (($I_G/(I_G+I_D)$)×100%) can have or include, for example, one of the following ranges: from 35% to 53%, or from 35% to 51%, or from 35% to 49%, or from 35% to 47%, or from 35% to 45%, or from 35% to 43%, or from 35% to 41%, or from 35% to 39%, or from 35% to 37%, or from 37% to 55%, or from 37% to 53%, or from 37% to 51%, or from 37% to 49%, or from 37% to 47%, or from 37% to 45%, or from 37% to 43%, or from 37% to 41%, or from 37% to 39%, or from 39% to 55%, or from 39% to 53%, or from 39% to 51%, or from 39% to 49%, or from 39% to 47%, or from 39% to 45%, or from 39% to 43%, or from 39% to 41%, or from 41% to 55%, or from 41% to 53%, or from 41% to 51%, or from 41% to 49%, or from 41% to 47%, or from 41% to 45%, or from 41% to 43%, or from 43% to 55%, or from 43% to 53%, or from 43% to 51%, or from 43% to 49%, or from 43% to 47%, or from 45% to 55%, or from 45% to 53%, or from 45% to 51%, or from 45% to 49%, or from 45% to 47%, or from 47% to 55%, or from 47% to 53%, or from 47% to 51%, or from 49% to 55%, or from 49% to 53%, or from 49% to 51%, or from 51% to 55%, or from 51% to 53%, or from 53% to 55%. The % crystallinity (($I_G/(I_G+I_D)$)×100%) can have or include, for example, one of the following ranges: greater than 35%, or greater than 37%, or greater than 39%, or greater than 41%, or greater than 43%, or less than 55%, or less than 53%, or less than 51%, or less than 49%, or less than 47%, or less than 45%, or less than 43%, or less than 41%, or less than 39%. Raman measurements were made using a Horiba LabRAM Aramis Raman microscope and the accompanying Lab Spec6 software.

The carbon black particles can be described (in a simplified manner) as an aggregate of a number of smaller particles, which are referred to as "primary particles." The carbon black aggregates can be, for example, assemblies of primary carbon black particles that are fused at the contact points and cannot readily be separated by shearing. The size of primary particles in a carbon black particle can vary. The number of primary particles in the aggregate can also vary, for example, from few to tens, or possibly hundreds. The number of primary particles and the arrangement of them in the carbon black aggregate not only dictate the size of the carbon black aggregate but also the structure of the carbon black. Without being bound by theory, it is believed that, for a given mass of particles, those particles with small average primary particle sizes can more effectively cover the electroactive material because the particles have a large number of contact points, thereby enhancing the performance of the particles. The average primary particle size ($P_{size}$) can be, for example, less than 50 nm, for example, from 12 to 50 nm, or from 12 to 22 nm. The average primary particle size can have or include, for example, one of the following ranges: from 12 nm to 45 nm, or from 12 nm to 40 nm, or from 12 nm to 35 nm, or from 12 nm to 30 nm, or from 12 nm to 25 nm, or from 12 nm to 20 nm, or from 17 nm to 50 nm, or from 17 nm to 45 nm, or from 17 nm to 40 nm, or from 17 nm to 35 nm, or from 17 nm to 30 nm, or from 17 nm to 25 nm, or from 22 nm to 50 nm, or from 22 nm to 45 nm, or from 22 nm to 40 nm, or from 22 nm to 35 nm, or from 22 nm to 30 nm, or from 27 nm to 50 nm, or from 27 nm to 45 nm, or from 27 nm to 40 nm, or from 27 nm to 35 nm, or from 32 nm to 50 nm, or from 32 nm to 45 nm, or from 32 nm to 40 nm, or from 37 nm to 50 nm, or from 37 nm to 45 nm, or from 42 nm to 50 nm. In certain embodiments, the average primary particle size is less than or equal to 50 nm, or less than or equal to 45 nm, or less than or equal to 40 nm, or less than or equal to 35 nm, or less than or equal to 30 nm, or less than or equal to 25 nm, or less than or equal to 20 nm. The average primary particle size is determined by ASTM D3849-14a, the entirety of which is incorporated herein by reference.

The carbon black particles can have a relatively low oxygen content, which can be indicative of the particles' purity and electrical conductivity properties. In some embodiments, the carbon black has an oxygen content of less than or equal to 1 wt %, or less than or equal to 0.8 wt %, or less than or equal to 0.6 wt %%, or less than or equal to 0.4 wt %, or less than or equal to 0.06 wt %%, or less than or equal to 0.03 wt %%. The oxygen content can have or include, for example, one of the following ranges: from 0.01 to 1 wt %, or from 0.03 to 1 wt %, or from 0.03 to 0.8 wt %, or from 0.03 to 0.6 wt % or from 0.03 to 0.4 wt %. The oxygen content can be determined by inert gas fusion in which a sample of carbon black particles are exposed to very high temperatures (e.g., about 3000° C.) under inert gas conditions. The oxygen in the sample reacts with carbon to form CO and $CO_2$, which can be monitored by a non-dispersive infrared technique. The total oxygen content is reported in weight percent relative to the total weight of the sample. Various oxygen analyzers based on the inert gas fusion methods are known in the art and commercially available, for example a LECO® TCH600 analyzer.

The carbon black particles can be produced by heat treating starting or "base" carbon black particles. In some embodiments, the aggregate size distributions (and possibly the D-values and/or D ratios) of the base carbon black particles do not change substantially with heat treatment. FIG. 1 depicts volume weighted cumulative distribution curves for base carbon black particles (Sample B') and the particles after heat treatment (Sample B). It is believed that the small broadening of the distribution for the heat treated material is likely due to its dispersability rather than with the changes in the particle true size distribution. This observation allows one to preselect the base carbon black particles based on its aggregate size distribution (such as Stoke's diameter $D_{50}$) and narrow particle size distribution (e.g., $D_{75}/D_{25}$ values and/or $(D_{90}-D_{10})/D_{50}$ values) described herein, in addition to other criteria, to maximize capability of the carbon black conductive additive to affect the electrical conductivity of the electrodes. As a result, the base carbon particles can be selected based on their aggregate size distributions, $D_{75}:D_{25}$ ratios, and/or $(D_{90}-D_{10})/D_{50}$ values and heat treated to produce the carbon black particles described herein having the desired surface energies and/or crystallinities (e.g., $L_a$, $L_c$ and/or % crystallinities) to enhance their performance as a conductive additive. The base carbon black particles are available from Cabot Corporation (Billerica, Mass.) under the names CSX-946 and CSX-960. Other base carbon black particles include those described in U.S. Provisional Patent Application No. 62/500,672, entitled "Carbon Black and Rubber Compounds Incorporating Same", filed on May 3, 2017, and U.S. patent application Ser. No. 15/586,670, entitled "Electrodes, Compositions, and Devices Having High Structure Carbon Blacks", filed on May 4, 2017, provided that the base carbon black particles have the aggregate size distributions, D-values and/or D ratios within the ranges of aggregate size distributions, D-values and/or D ratios of the desired resulting carbon black particles described and claimed herein. Both applications are hereby incorporated by reference.

As indicated above, in certain embodiments, the carbon black particles are heat-treated carbon black particles. "Heat-treated carbon black particles" are carbon black particles that have undergone a "heat treatment," which as used herein, generally refers to a post-treatment of base carbon black particles that had been previously formed, e.g., by a furnace black process. The heat treatment can occur under inert conditions (i.e., in an atmosphere substantially devoid of oxygen), and typically occurs in a vessel other than that in which the base carbon black particles were formed. Inert conditions include, but are not limited to, a vacuum, and an atmosphere of inert gas, such as nitrogen, argon, and the like. In some embodiments, the heat treatment of carbon black particles under inert conditions is capable of reducing the number of impurities (e.g., residual oil and salts), defects, dislocations, and/or discontinuities in carbon black crystallites and/or increase the degree of graphitization.

The heat treatment temperatures can vary. In various embodiments, the heat treatment (e.g., under inert conditions) is performed at a temperature of at least 1000° C., or at least 1200° C., or at least 1400° C., or at least 1500° C., or at least 1700° C., or at least 2000° C. In some embodiments, the heat treatment is performed at a temperature ranging from 1000° C. to 2500° C., e.g., from 1400° C. to 1600° C. Heat treatment performed at a temperature refers to one or more temperatures ranges disclosed herein, and can involve heating at a steady temperature, or heating while ramping the temperature up or down, either stepwise and/or otherwise.

The heat treatment time periods can vary. In certain embodiments, the heat treatment is performed for at least 15 minutes, e.g., at least 30 minutes, or at least 1 hour, or at least 2 hours, or at least 6 hours, or at least 24 hours, or any of these time periods up to 48 hours, at one or more of the temperature ranges disclosed herein. In some embodiments, the heat treatment is performed for a time period ranging from 15 minutes to at least 24 hours, e.g., from 15 minutes to 6 hours, or from 15 minutes to 4 hours, or from 30 minutes to 6 hours, or from 30 minutes to 4 hours.

Generally, the heat treatment is performed until one or more desired properties of the carbon black particles (e.g., surface energy, $L_a$ crystallite size, $L_c$ crystallite size, and/or % crystallinity) are produced. As an example, during initial periods of heat treatment, test samples of heat treated particles can be removed, and their $L_c$ crystallite sizes can be measured. If the measured $L_c$ crystallite sizes are not as desired, then various heat treatment process parameters (such as heat treatment temperature and/or residence time) can be adjusted until the desired $L_c$ crystallite size is produced.

The carbon black particles can be used in a variety of energy storage devices, such as lithium-ion batteries. As an example, the carbon black particles can be used in a cathode composition for a lithium-ion battery. The cathode composition typically includes a mixture of one or more electroactive materials, a binder, and a conductive aid (such as the carbon black particles). As used herein, an "electroactive material" means a material capable of undergoing reversible, Faradaic and/or capacitive electrochemical reactions.

In some embodiments, the electroactive material is a lithium ion-based compound. Exemplary electroactive materials include those selected from at least one of:

$LiMPO_4$, wherein M represents one or more metals selected from Fe, Mn, Co, and Ni;

$LiM'O_2$, wherein M' represents one or more metals selected from Ni, Mn, Co, Al, Mg, Ti, V, Cr, Fe, Zr, Ga, and Si;

$Li(M'')_2O_4$, wherein M'' represents one or more metals selected from Ni, Mn, Co, Al, Mg, Ti, V, Cr, Fe, Zr, Ga, and Si (e.g., $Li[Mn(M'')]_2O_4$); and $Li_{1+x}(Ni_yCo_{1-y-z}Mn_z)_{1-x}O_2$, wherein x ranges from 0 to 1, y ranges from 0 to 1 and z ranges from 0 to 1.

In certain embodiments, the electroactive material is selected from at least one of $LiNiO_2$; $LiNi_xAl_yO_2$ where x varies from 0.8-0.99, y varies from 0.01-0.2, and x+y=1; $LiCoO_2$ "LCO"; $LiMn_2O_4$; $Li_2MnO_3$; $LiNi_{0.5}Mn_{1.5}O_4$; $LiFe_xMn_yCo_zPO_4$ where x varies from 0.01-1, y varies from 0.01-1, z varies from 0.01-0.2, and x+y+z=1; and $LiNi_{1-x-y}Mn_xCo_yO_2$, wherein x ranges from 0.01 to 0.99 and y ranges from 0.01 to 0.99.

In other embodiments, the electroactive material is selected from at least one of $Li_2MnO_3$; $LiNi_{1-x-y}Mn_xCo_yO_2$ wherein x ranges from 0.01 to 0.99 and y ranges from 0.01 to 0.99; $LiNi_{0.5}Mn_{1.5}O_4$; $Li_{1+x}(Ni_yCo_{1-y-z}Mn_z)_{1-x}O_2$ ("NCM"), wherein x ranges from 0 to 1, y ranges from 0 to 1 and z ranges from 0 to 1; and layer-layer compositions containing at least one of an $Li_2MnO_3$ phase and an $LiMn_2O_3$ phase.

In some embodiments, the electrode includes a mixture of active materials having a nickel-doped Mn spinel, and a layer-layer Mn rich composition. The nickel-doped Mn spinel can have the formula $LiNi_{0.5}Mn_{1.5}O_4$, and the layer-layer Mn rich composition can contain a $Li_2MnO_3$ or a $LiMn_2O_3$ phase, and mixtures thereof.

The concentration of electroactive material(s) in the electrode can vary, depending on the particular type of energy storage device. In some embodiments, the electroactive material is present in the cathode composition in an amount of at least 80% by weight, relative to the total weight of the composition, e.g., an amount of at least 90%, or an amount ranging from 80% to 99%, or an amount ranging from 90% to 99% by weight, relative to the total weight of the composition. The electroactive material is typically in the form of particles. In some embodiments, the electroactive particles have a $D_{50}$ particle size distribution ranging from 100 nm to 30 μm, e.g., a $D_{50}$ ranging from 1-15 μm. In other embodiments, the electroactive particles have a $D_{50}$ ranging from 1-6 μm, e.g., from 1-5 μm.

Typically, the cathode composition further includes one or more binders to enhance the mechanical properties of the formed electrode. Exemplary binder materials include, but are not limited to, fluorinated polymers such as poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders, such as poly(ethylene) oxide, polyvinyl-alcohol (PVA), cellulose, carboxymethylcellulose (CMC), starch, hydroxypropylcellulose, regenerated cellulose, polyvinyl pyrrolidone (PVP), and copolymers and mixtures thereof. Other possible binders include polyethylene, polypropylene, ethylene-propylene-diene terpolymer (EPDM), sulfonated EPDM, styrene-butadiene rubber (SBR), and fluoro rubber and copolymers and mixtures thereof. In some embodiments, the binder is present in the cathode composition in an amount of 1 to 10% by weight.

Like the concentrations of the electroactive material, the concentrations of the carbon black particles can vary, e.g., from 0.5-10% by weight. For example, for batteries used in electric vehicles, the carbon black amount can range from 1-2% by weight. For batteries used in plug-in vehicles, the carbon black amount can range from 3-6% by weight. For batteries used in hybrid vehicles, the carbon black amount can range from 5-10% by weight.

An electrode (e.g., cathode) composition can be made by homogeneously interspersing (e.g., by uniformly mixing) the carbon black particles with the electroactive material. In some embodiments, the binder is also homogeneously interspersed with the carbon black particles and electroactive material. The electrode composition can take the form of a paste or a slurry, in which particulate electroactive material, carbon black, and binder (if present) are combined in the presence of one or more solvents. Exemplary solvents include, e.g., N-methylpyrrolidone (NMP), acetone, alcohols, and water. The components of the electrode composition can be combined in the solvent in any order so long as the resulting mixture is substantially homogeneous, which can be achieved by shaking, stirring, etc. In certain embodiments, the electrode composition is a solid resulting from solvent removal from the paste or slurry.

In some embodiments, an electrode is formed by depositing the paste onto an electrically conducting substrate (e.g., an aluminum current collector), followed by removing the solvent. In certain embodiments, the paste has a sufficiently high solids loading to enable deposition onto the substrate while minimizing the formation of inherent defects (e.g., cracking) that may result with a less viscous paste (e.g., having a lower solids loading). Moreover, a higher solids loading reduces the amount of solvent needed. The solvent is removed by drying the paste, either at ambient temperature or under low heat conditions, e.g., temperatures ranging from 20° to 100° C. The deposited cathode/current collector can be cut to the desired dimensions, optionally followed by calendering.

The formed electrode can be incorporated into a lithium-ion battery according to methods known in the art, for example, as described in "Lithium Ion Batteries Fundamentals and Applications", by Yuping Wu, CRC press, (2015).

In other embodiments, the carbon black particles are used (e.g., incorporated) in electrodes of other energy storage devices, such as, primary alkaline batteries, primary lithium batteries, nickel metal hydride batteries, sodium batteries, lithium sulfur batteries, lithium air batteries, and supercapacitors. Methods of making such devices are known in the art and are described, for example, in "Battery Reference Book", by TR Crompton, Newness (2000).

EXAMPLES

Example 1

This example describes the preparation of a carbon black ("Sample B") in accordance with an embodiment of the invention by heat treating a base carbon black. The base carbon black was a furnace carbon black (CSX-946 from Cabot Corporation) that had a BET surface area (BET SA) of 394 $m^2$/g, an oil absorption number (OAN) of 162 ml/100 g, a surface energy (SEP) of 18 mJ/$m^2$, an $L_a$ crystallite size of 19.5 Å, a crystallinity of about 31%, and an $L_c$ crystallite size of about 14 Å. The base carbon black was heat treated at several temperatures ranging from 1400° C. in a box oven under an inert nitrogen atmosphere for 2 hours. The material was then ground with a lab mill (Perten 3710).

The resulting carbon black, Sample B, had a BET SA of 169 m$^2$/g, an OAN of 154 ml/100 g, a surface energy (SEP) of 7 mJ/m$^2$, an $L_a$ crystallite size of 26.4 Å, a crystallinity of about 38%, an $L_c$ crystallite size of about 19 Å, a $D_{50}$ value of 91 nm, a $D_{75}$:$D_{25}$ ratio of 2.0, and a ($D_{90}$–$D_{10}$)/$D_{50}$ value of 1.4. With the heat treatment, there was a modest change to the particle structure as indicated by the OAN. However, the BET surface area, the size of carbon crystallite domains (e.g., $L_a$), particle crystallinity and surface energy changed significantly.

Example 2

Figure 2:
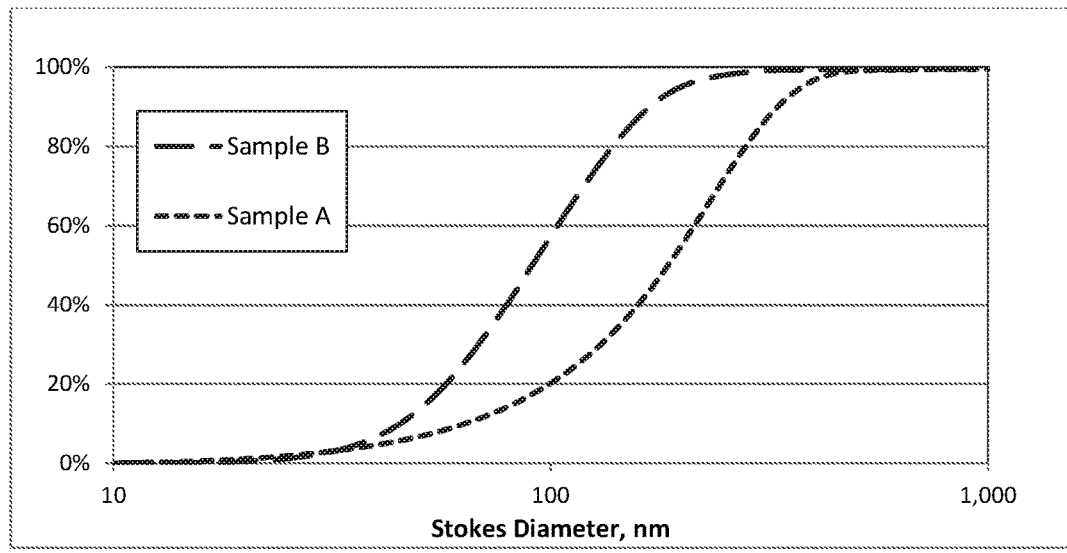
FIG. 2 is a plot showing volume-weighted cumulative distributions, as measured by the DCS method, for Sample A and Sample B of Example 1.

This example describes a process of making a cathode and the results of comparative testing for Sample A and Sample B at a very low loading (0.6 wt %) in NCM/LCO electrodes at high compression. Sample A is a carbon black made in accordance with U.S. Pat. No. 9,287,565. Sample A had a BET surface area (BET SA) of 160 m$^2$/g, an OAN of 162 ml/100 g, a surface energy (SEP) of 6 mJ/m$^2$, an $L_a$ crystallite size of 28 Å, a crystallinity of about 39%, an $L_c$ crystallite size of about 21 Å, a $D_{50}$ value of 185.5 nm, a $D_{75}$:$D_{25}$ ratio of 2.26, and a ($D_{90}$–$D_{10}$)/$D_{50}$ value of 1.4. FIG. 2 shows the volume weight cumulative distribution curves for Samples A and B.

Electrodes were prepared by mixing a slurry of 10 wt % Kynar® HSV 900 polyvinylidene fluoride-based resin (PVDF, by Arkema with molecular weight of 900,000) in N-methyl-2-pyrrolidone (NMP, Sigma Aldrich >99% HPLC grade), carbon black (as a conductive carbon additive, CCA), and a mixture of two active materials (LCO (Umicore) and NCM 111 (Toda) in a 4:1 mass ratio). The total solids (i.e., concentration of solids) was 78 wt % in NMP. The cathode composition was 98.4 wt % active material (LCO and NCM 111), 0.6 wt % CCA and 1 wt % PVDF binder on the dry basis. The slurries were mixed with a Thinky mixer (Model ARE-310) for 30 minutes.

The electrode slurries were coated on aluminum foils using an automated doctor blade coater (Model MSK-AFA-III from MTI Corp.) targeting a coating density of 20 mg/cm$^2$. The NMP was evaporated for 20 minutes in a convection oven set at 80° C. Fifteen-millimeter-in-diameter discs were punched for coin-cell preparation and dried at 110° C. under vacuum for a minimum of 4 hours. Discs were calendered at 3.3 g/cc.

Electrode sheet resistance for calendered electrodes (discs) was measured with a Lucas Lab 302 four-probe stand and an SP4 probe head connected to the rear of a Keithley 2410-C source meter. The reported values are direct ohm readings from the meter, at a current of 0.1 mA, and a cathode calendered density of 3.3 g/cc.

The electrodes with 0.6 wt % Sample A showed electrical resistance of 600,000 Ohms, whereas the one with Sample B was 200,000 Ohms at the same CCA loading.

Although basic analytical characteristics (such as surface area, structure, $L_a$ and $L_c$ crystallite sizes, % crystallinity and surface energy) were comparable between Sample A and Sample B, the latter appeared to be more effective in affecting the electrical properties of the electrode at very low CCA loading. This result is believed due to smaller Stoke's $D_{50}$ diameter for Sample B, which enables a larger number of conductive contacts in the cathode at the same CCA mass loading versus Sample A, and/or the lower $D_{75}$:$D_{25}$ ratio.

After calendering, the cathode discs were assembled into 2032 coin-cells in an argon-filled glove box (M-Braun) for testing against lithium foil. Glass fiber micro filters (Whatman GF/A) were used as separators. The electrolyte was 100 microliters of ethylene carbonate-dimethyl carbonate-ethylmethyl carbonate (EC-DMC-EMC), vinylene carbonate (VC) 1%, LiPF$_6$ (1M, BASF). Four coin-cells were assembled for each formulation tested.

Coin cells were tested on a Maccor series 4000 battery cycler according to the following procedure: two C/5 charge-discharge formation cycles in a 2.8-4.3 voltage window, with constant voltage charging step up to C/20, then C/2 charging with constant voltage charging step up to C/20 and C/5, C/2, 1 C, 2 C, and 3 C discharge rates. 1 C rate (h$^{-1}$) is defined as the current to discharge the cell in 1 hr. Reported capacities are the averages of four coin-cells, normalized to mAh/g of active cathode mass. The 3 C capacities for Sample A and B were 82 and 110 mAh/g, respectively, demonstrating the benefits of a conductive additive having a smaller aggregate size (in this example, $D_{50}$).

Example 3

This Example describes a process of making a thin (10 mg/cm$^2$) electrode including Sample A and Sample B at various conductive carbon additive ("CCA") loadings, and the results of a comparative evaluation.

Electrodes were prepared by mixing slurries of 10 wt % Kynar® HSV 900 polyvinylidene fluoride-based resin (PVDF, by Arkema with molecular weight of 900,000) in N-methyl-2-pyrrolidone (NMP, Sigma Aldrich >99% HPLC grade), carbon black (as a CCA), active material (NCM 111, Toda, approximately 7 microns $D_{50}$ particle size) and NMP. The slurries were mixed for 30 minutes with a SPEX® 8000M mixer/mill and two tungsten carbide media balls. Formulations, total solids loadings, and coated densities of the slurries are reported in Table 1:

TABLE 1

Slurry formulations tested

| Formulation NCM:CB:PVDF | Slurry total % solids | Coated density mg/cm$^2$ |
|---|---|---|
| 96.5:2:1.5 | 70 | 10 |
| 93:4:3 | 68 | 10 |
| 86:8:6 | 58 | 10 |

The electrode slurries were coated on aluminum foils using an automated doctor blade coater (Model MSK-AFA-III from MTI Corp.). The NMP was evaporated for 20 minutes in a convection oven set at 80° C. Fifteen-millimeter-in-diameter discs were punched for coin-cell preparation and dried at 110° C. under vacuum for a minimum of 4 hours. Discs were calendered at 2.5 g/cc with a manual roll press, and assembled into 2032 coin-cells in an argon-filled glove box (M-Braun) for testing against lithium foil. Glass fiber micro filters (Whatman GF/A) were used as separators. The electrolyte was 100 microliters of ethylene carbonate-dimethyl carbonate-ethylmethyl carbonate (EC-DMC-EMC), vinylene carbonate (VC) 1%, LiPF$_6$ (1M, BASF).

Coin cells were tested on a Maccor series 4000 battery cycler according to the following procedure: two C/5 charge-discharge formation cycles in a 2.8-4.3 voltage window, with constant voltage charging step up to C/20, then C/2 charging with constant voltage charging step up to C/20 and C/5, C/2, 1 C, 2 C, 3 C, 4 C, 5 C, 7 C, 10 C, 15 C, and 20 C discharge rates. 1 C rate (h$^{-1}$) is defined as the current to discharge the cell in 1 hr. Typically, four individual coin cells were assembled and tested for each CCA loading. Reported capacities are averages, normalized to mAh/g of active cathode mass.

Sheet resistance of coated electrodes was measured with a Lucas Lab 302 four-probe stand and an SP4 probe head connected to the rear of a Keithley 2410-C source meter. The reported values are direct ohm readings from the meter, at a current of 0.1 mA, and a cathode calendered density of 2.5 g/cc.

Figure 3:
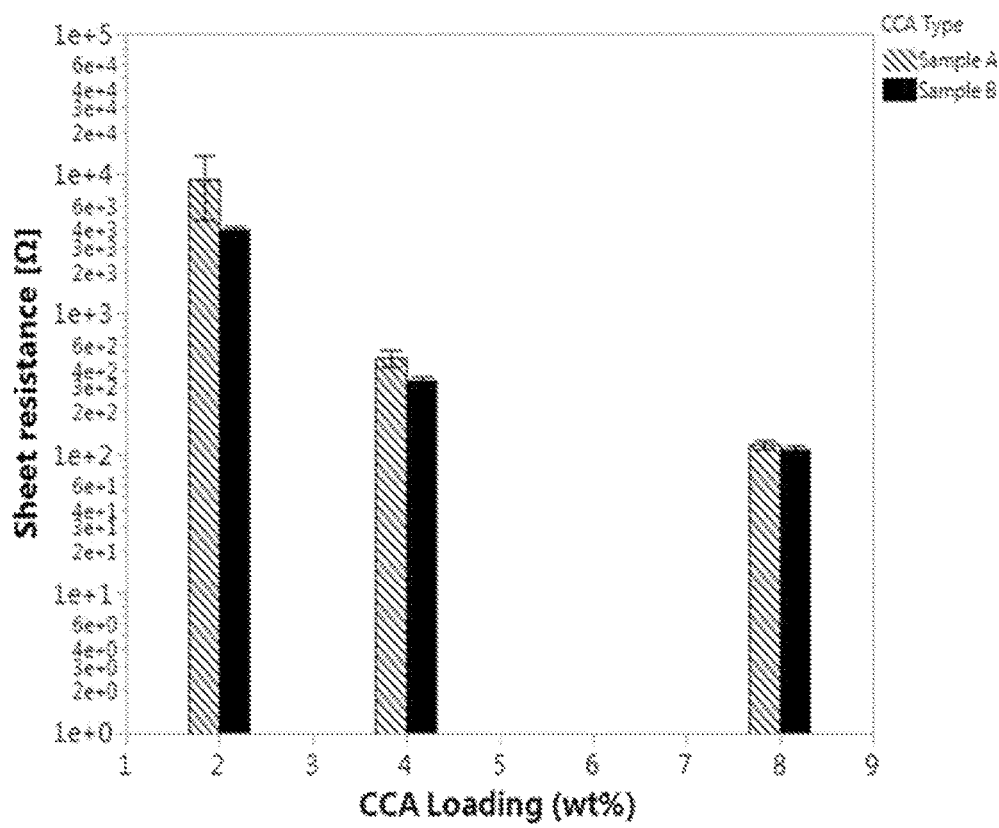
FIG. 3 is a graph showing electrical sheet resistances for electrodes having Sample A and Sample B at various conductive carbon additive (CCA) loadings.
Figure 4A:
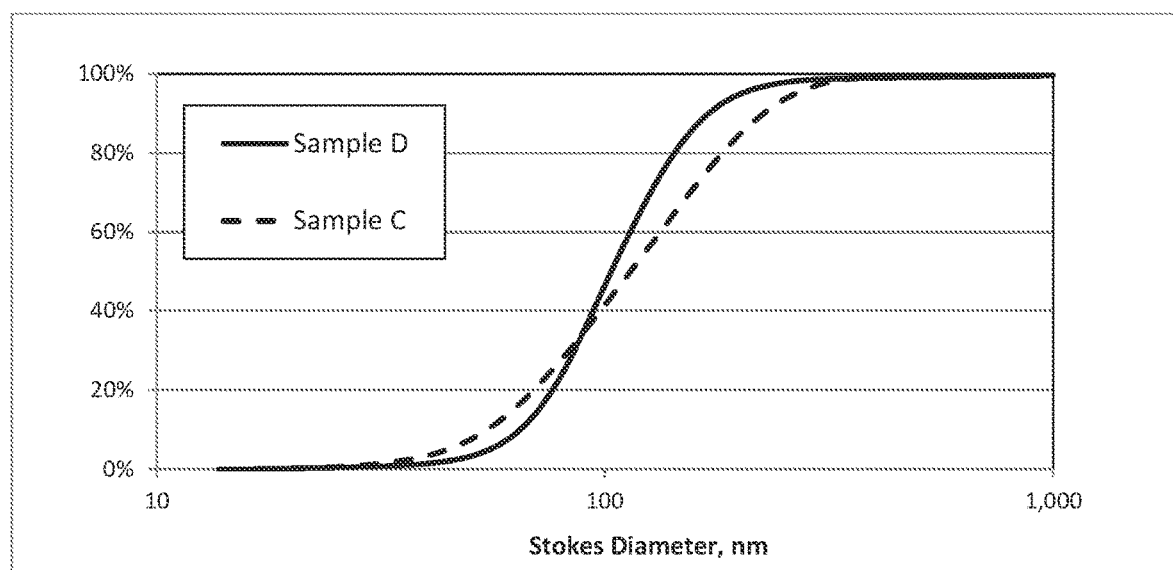
FIG. 4A is a plot showing volume-weighted, cumulative aggregate size distributions (Stokes diameter), as measured by the DCS method, for Sample C and Sample D of Example 5.
Figure 4B:
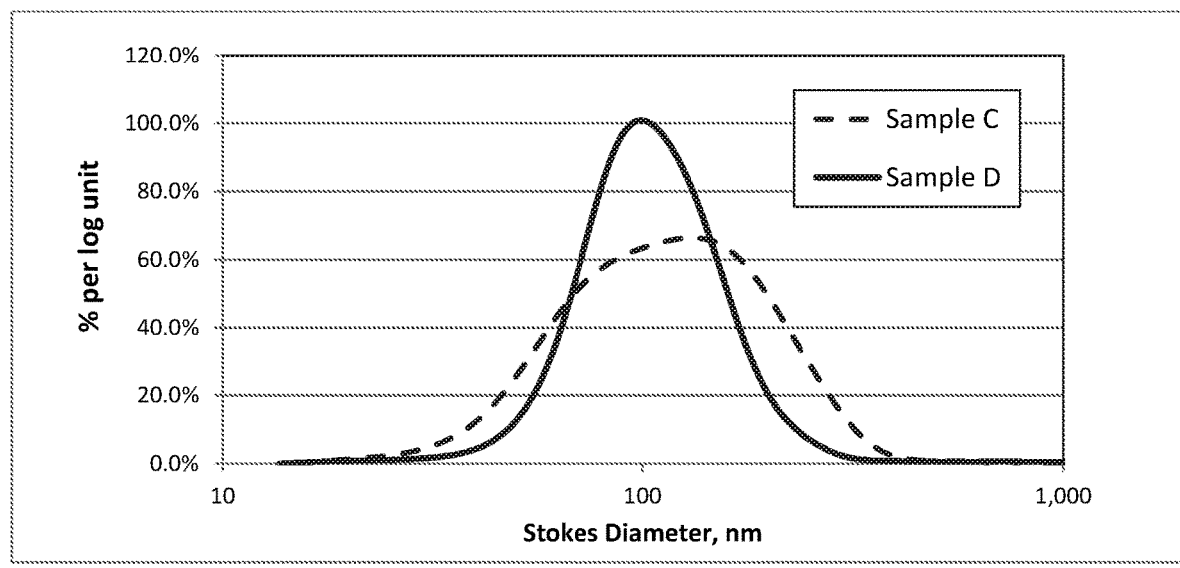
FIG. 4B is a plot showing volume-weighted geometric, frequency aggregate size distributions (Stokes diameter), as measured by the DCS method, for Sample C and Sample D of Example 5.

As shown in FIG. 3, the compressed electrodes based on Sample B showed lower electrode sheet resistance. There was significantly less differentiation between samples at higher carbon black loading (such as 8 wt %). The 10 C capacity for coin cells with 2 wt % CCA were 108.9 mAh/g and 116.7 mAh/g for Sample A and Sample B, respectively, demonstrating substantial improvement for the carbon black with smaller Stoke's aggregate diameter ($D_{50}$).

After evaluating the C-rate capability of the cells, they were tested for hybrid pulse power characterization (HPPC). A full description of the HPPC test can be found in US DOE Vehicle Technologies Battery Test Manual for Plug-In Hybrid Electric Vehicles, 2008, Idaho National Lab INL/EXT-07-12536. Fully recharged cells were submitted to 5 C, 10 s discharge current pulses, 40 s rests, 3.75 C, 10 s charge current pulses, by 10% state of charge decrements achieved by 1 C discharge steps of 6 minutes. From this test, the DC-IR and ionic discharge resistances were calculated using Ohm's law. DC-IR is based on the instant Ohmic drop, and ionic resistance is the end of pulse resistance minus instant Ohmic drop. The results for DC-IR and ionic resistance at 50% state of charge ("SoC") measured for cells containing Sample A and Sample B at 2 wt % loading are summarized in Table 2. The data further confirms that Sample B with lower Stoke's diameter ($D_{50}$) enabled lower electrical resistivity, which is highly beneficial for the power characteristic of a battery.

TABLE 2

| | Results from HPPC testing | |
|---|---|---|
| Sample | DC-IR at 50% SoC Ohm | Ionic R at 50% SoC Ohm |
| Sample A | 16.6 | 3.4 |
| Sample B | 14.4 | 3.6 |

Example 4

This example describes the results of comparative testing for Sample A and Sample B carbon black (CB) at 2 wt % in thick (30 mg/cm²) NCM electrodes.

Slurries having NCM 111 (Toda):CB:PVDF=96.5:2:1.5 wt. ratio were prepared at 70 wt % total solids using Thinky mixer (model ARE-310) for 30 minutes. The electrode slurries were coated on aluminum foils using an automated doctor blade coater (Model MSK-AFA-III from MTI Corp.) targeting a coating density of 30 mg/cm². The NMP was evaporated for 20 minutes in a convection oven set at 80° C. Fifteen-millimeter-in-diameter discs were punched for coin cell preparation and dried at 110° C. under vacuum for a minimum of 4 hours. Discs were calendered at 2.5 g/cc with a manual roll press. Both electrode (sheet) resistance and bulk (volume) conductivity were measured.

The sheet resistance measurements procedure was identical to the one described in Example 3, except the calendering density of the electrode was 3 g/cc.

Electrode bulk conductivity for 15-mm-diameter electrode discs coated on aluminum was measured with a drop gauge (Sylvac, 0.001 mm precision) in which DC resistance was measured between an aluminum current collector pressed against a stand (insulated from the gauge), and a contact made on the top of the electrode coating with a 0.4-cm² cylindrical carbide tip (Carbide Probes Inc.) applied at 10 psi against the sample. The resistivity of the electrode between the tip and the base was measured with a Keithley 2410-C Source Meter. Bulk conductivity (S/cm) of the electrodes was calculated by the formula S/cm=(1/R)*(l/s) where l is the electrode thickness minus current collector (in cm) and s is the contact area (0.4 cm²). The results are shown in Table 3.

TABLE 3

| | Results from conductivity measurements | | |
|---|---|---|---|
| Sample | Electrode Resistance Ohm | Volume Resistivity Ohm · cm | Bulk conductivity S/cm |
| Sample A | 6700 | 102.5 | $2.3 \times 10^{-4}$ |
| Sample B | 3300 | 68 | $3.6 \times 10^{-4}$ |

After calendering, the cathode discs were assembled into 2032 coin-cells in an argon-filled glove box (M-Braun) for testing against lithium foil. Glass fiber micro filters (Whatman GF/A) were used as separators. The electrolyte was 100 microliters of ethylene carbonate-dimethyl carbonate-ethylmethyl carbonate (EC-DMC-EMC), vinylene carbonate (VC) 1%, LiPF6 (1M, BASF). Four coin-cells were assembled for each formulation, and capacity was tested according to the method described in Example 2. Reported capacities are the averages, normalized to mAh/g of active cathode mass. The 3 C capacity for Samples A and B were 92 and 96 mAh/g, respectively.

Example 5

This example describes the results of comparative testing for Sample C and Sample D carbon blacks (CB) at 2 wt % in NCM electrodes. Sample C, had a BET SA of 100 m²/g, an OAN of 232 ml/100 g, a surface energy (SEP) of ≤3 mJ/m2, an $L_a$ crystallite size of 26.5 Å, a crystallinity of about 38%, an $L_c$ crystallite size of about 19.2 Å, a $D_{50}$ value of 114 nm, a $D_{75}$:$D_{25}$ ratio of 2.2, and a $(D_{90}-D_{10})/D_{50}$ value of 1.5. Sample D, had a BET SA of 95 m²/g, an OAN of 247 ml/100 g, a surface energy (SEP) of ≤3 mJ/m2, an $L_a$ crystallite size of 27.1 Å, a crystallinity of about 38.4%, an $L_c$ crystallite size of about 19.5 Å, a $D_{50}$ value of 104 nm, a $D_{75}$:$D_{25}$ ratio of 1.76, and a $(D_{90}-D_{10})/D_{50}$ value of 1.3. FIGS. 2A and 2B show volume weighted cumulative distribution curves and volume weighted geometric distribution curves, respectively, for Samples C and D.

The methods for electrode preparation and the measurement were identical to those described in Example 3. The formulation composition was NCM 111 (Toda):CB:PVDF=96.5:2:1.5 with total solids of 70 wt % in NMP. The coating density was 10 mg/cm². After drying, the discs were calendered to 2.5 g/cc.

Table 4 shows the results of electrode sheet resistance and electrical bulk conductivity. As shown, Sample D, with a narrower aggregate size distribution as demonstrated by the $D_{75}$:$D_{25}$ ratio value and the $(D_{90}-D_{10})/D_{50}$ value, outperformed Sample C in both electrode sheet resistance and bulk conductivity. This example demonstrates the advantage of carbon black particles with a narrower aggregate size distribution when other basic analytical characteristics of the conductive additive were similar.

TABLE 4

Resistance and conductivity test results

| Sample | Electrode Resistance Ohm | Bulk conductivity S/cm |
|---|---|---|
| Sample C | 3700 | $1.4 \times 10^{-4}$ |
| Sample D | 2400 | $3.4 \times 10^{-4}$ |

Example 6

Figure 5:
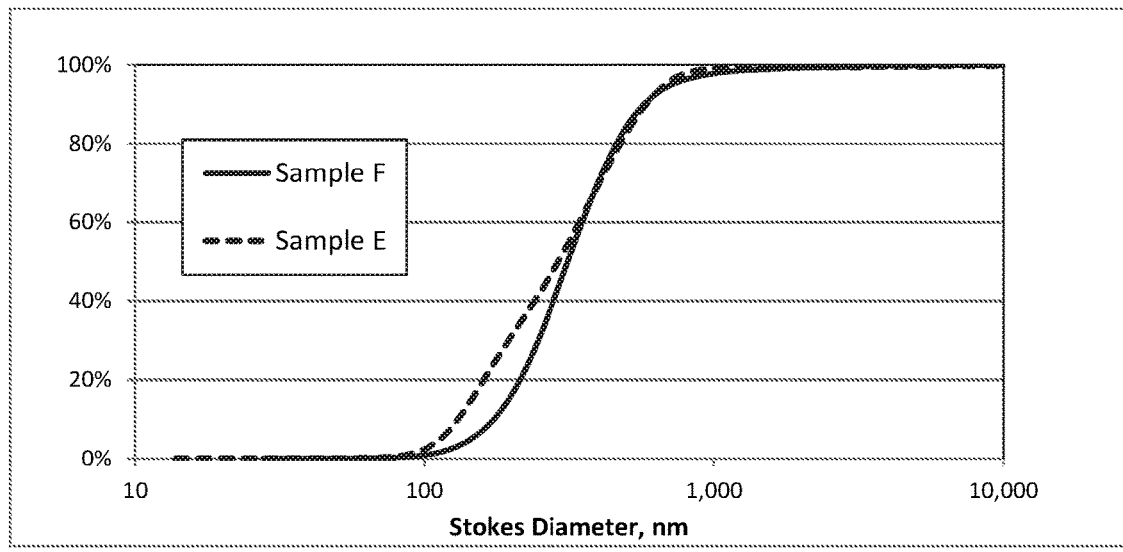
FIG. 5 is a plot showing volume-weighted cumulative distributions, as measured by the DCS method, for Sample E and Sample F of Example 6.

This example describes the results of comparative testing for Sample E and Sample F, both CCAs, at 2 wt % and 8 wt % in NCM electrodes. Sample E was an acetylene black that had a BET SA of 40 m$^2$/g, an OAN of 177 ml/100 g, a surface energy (SEP) of ≤3 mJ/m$^2$, an $L_a$ crystallite size of 30.4 Å, a crystallinity of about 41.1%, an $L_c$ crystallite size of about 23.9 Å, a $D_{50}$ value of 270.5 nm, a $D_{75}$:$D_{25}$ ratio of 2.71, and a $(D_{90}-D_{10})/D_{50}$ value of 1.7. Sample F was a carbon black that had a BET SA of 42 m$^2$/g, an OAN of 201 ml/100 g, a surface energy (SEP) of ≤3 mJ/m$^2$, an $L_a$ crystallite size of 30 Å, a crystallinity of about 39.2%, an $L_c$ crystallite size of about 20.5 Å, a $D_{50}$ value of 312 nm, a $D_{75}$:$D_{25}$ ratio of 1.85, and a $(D_{90}-D_{10})/D_{50}$ value of 1.3. FIG. 5 shows volume weighted cumulative distribution curves for Samples E and F.

The methods for electrode preparation and measurement were identical to those described in Example 3. Two formulations were prepared with 2 wt % and 8 wt % CCA loading. Specifically, the compositions were NCM 111 (Toda):CCA:PVDF=96.5:2:1.5 with total solids of 70 wt % and NCM:CCA:PVDF=86:8:6 with a total solids of 58 wt % in NMP. The slurries were mixed for 30 minutes with a SPEX® 8000M mixer/mill and two tungsten carbide media balls.

The electrode slurries were coated on aluminum foils using an automated doctor blade coater (Model MSK-AFA-III from MTI Corp.) and targeting 10 mg/cm$^2$ coating density. The NMP was evaporated for 20 minutes in a convection oven set at 80° C. Fifteen-millimeter-in-diameter discs were punched for coin-cell preparation and dried at 110° C. under vacuum for a minimum of 4 hours. Discs were calendered at 2.5 g/cc with a manual roll press, and assembled into 2032 coin-cells following the procedures described in Example 3.

Electrode resistance and electrical bulk conductivity were measured as described above. The test results are summarized in Table 5. While $D_{50}$ value for Sample F was slightly larger than that of Sample E (312 nm vs 270 nm), it is believed that its substantially narrower aggregate size distribution, as demonstrated by the $D_{75}/D_{25}$ and $(D_{90}-D_{10})/D_{50}$ values, provided lower electrode sheet resistivity and higher electrical bulk conductivity.

TABLE 5

| Sample | CCA Loading wt % | Electrode Resistance Ohm | Bulk Conductivity S/cm |
|---|---|---|---|
| Sample E | 2 | 192500 | — |
| Sample F | 2 | 84000 | — |
| Sample E | 8 | 195 | $3.7 \times 10^{-3}$ |
| Sample F | 8 | 120 | $4.3 \times 10^{-3}$ |

The use of the terms "a" and "an" and "the" is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All publications, applications, ASTM standards, and patents referred to herein are incorporated by reference in their entirety.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An electrode, comprising:
an electrically conductive substrate; and
a composition supported by a surface of the electrically conductive substrate, the composition comprising carbon black particles having a Brunauer-Emmett-Teller (BET) surface area ranging from 80 m$^2$/g to 1100 m$^2$/g, an oil absorption number equal to or less than 200 mL/100 g, a surface energy of 10 mJ/m$^2$ or less, a particle size distribution with a $D_{75}$:$D_{25}$ ratio of less than 2.1, and a particle size distribution with a $D_{50}$ value equal to or less than 165 nm.

2. The electrode of claim 1, wherein the carbon black particles have an $L_a$ crystallite size equal to or greater than 22 Angstroms, and/or an $L_c$ crystallite size equal to or greater than 17 Angstroms.

3. The electrode of claim 1, wherein the carbon black particles have an $L_a$ crystallite size equal to or less than 50 Angstroms, and/or an $L_c$ crystallite size equal to or less than 40 Angstroms.

4. The electrode of claim 1, wherein the carbon black particles have an oil absorption number equal to or greater than 140 mL/100 g.

5. The electrode of claim 1, wherein the carbon black particles have a statistical thickness surface area equal to or greater than 30 m$^2$/g.

6. The electrode of claim 1, wherein the carbon black particles have a statistical thickness surface area equal to or less than 250 m$^2$/g.

7. The electrode of claim 1, wherein the carbon black particles have a % crystallinity ($I_G/(I_G+I_D)$) equal to or less than 45%.

8. The electrode of claim 1, wherein the carbon black particles have a % crystallinity ($I_G/(I_G+I_D)$) equal to or greater than 35%.

9. The electrode of claim 1, wherein the $D_{50}$ value is equal to or greater than 70 nm.

10. The electrode of claim 1, wherein the composition comprises from 0.5 wt % to 10 wt % of the carbon black particles.

11. The electrode of claim 1, wherein the composition further comprises a lithium ion-based electroactive material.

12. The electrode of claim 1, wherein the composition comprises an electroactive material comprising lithium and cobalt, and from 0.5 wt % to 10 wt % of the carbon black particles.

13. The electrode of claim 1, wherein the carbon black particles have a $(D_{90}-D_{10})/D_{50}$ value less than 1.5.

14. The electrode of claim 1, wherein the carbon black particles have a particle size distribution with $D_{75}:D_{25}$ ratio of greater than 1.05, and/or a $(D_{90}-D_{10})/D_{50}$ value greater than 1.05.

15. The electrode of claim 1, wherein the carbon black particles have a monomodal particle size distribution.

16. An energy storage device comprising the electrode of claim 1.

17. The energy storage device of claim 16, wherein the device is selected from the group consisting of a lithium ion battery, a primary alkaline battery, a primary lithium battery, a nickel metal hydride battery, a sodium battery, a lithium sulfur battery, a lithium air battery, and a supercapacitor.

18. Carbon black particles having a Brunauer-Emmett-Teller (BET) surface area ranging from 80 $m^2/g$ to 1100 $m^2/g$, an oil absorption number equal to or less than 200 mL/100 g, a surface energy of 10 $mJ/m^2$ or less, a particle size distribution with a $D_{75}:D_{25}$ ratio of less than 2.1, and a particle size distribution with a $D_{50}$ value equal to or less than 165 nm.

19. The carbon black particles of claim 18, wherein the carbon black particles have an $L_a$ crystallite size equal to or greater than 22 Angstroms, and/or an $L_c$ crystallite size equal to or greater than 17 Angstroms.

20. The carbon black particles of claim 18, wherein the carbon black particles have an $L_a$ crystallite size equal to or less than 50 Angstroms, and/or an $L_c$ crystallite size equal to or less than 40 Angstroms.

21. The carbon black particles of claim 18, wherein the carbon black particles have an oil absorption number equal to or greater than 140 mL/100 g.

22. The carbon black particles of claim 18, wherein the carbon black particles have a statistical thickness surface area equal to or greater than 30 $m^2/g$.

23. The carbon black particles of claim 18, wherein the carbon black particles have a statistical thickness surface area equal to or less than 250 $m^2/g$.

24. The carbon black particles of claim 18, wherein the carbon black particles have a % crystallinity ($I_G/(I_G+I_D)$) equal to or less than 45%.

25. The carbon black particles of claim 18, wherein the carbon black particles have a % crystallinity ($I_G/(I_G+I_D)$) equal to or greater than 35%.

26. The carbon black particles of claim 18, wherein the $D_{50}$ value is equal to or greater than 70 nm.

27. The carbon black particles of claim 18, wherein the carbon black particles have a $(D_{90}-D_{10})/D_{50}$ value less than 1.5.

28. The carbon black particles of claim 18, wherein the carbon black particles have a particle size distribution with $D_{75}:D_{25}$ ratio of greater than 1.05, and/or a $(D_{90}-D_{10})/D_{50}$ value greater than 1.05.

29. The carbon black particles of claim 18, wherein the carbon black particles have a monomodal particle size distribution.

* * * * *